United States Patent [19]
Jahn

[11] 3,954,479
[45] May 4, 1976

[54] HIGH-TEMPERATURE AND WEAR-RESISTANT ANTIFRICTION MATERIAL HAVING LOW THERMAL EXPANSIONS

[75] Inventor: Walter Jahn, Ingelheim, Germany
[73] Assignee: Jenaer Glaswerk Schott & Gen., Mainz, Germany
[22] Filed: Feb. 19, 1974
[21] Appl. No.: 443,512

[30] Foreign Application Priority Data
Feb. 19, 1973 Germany............................ 2308100

[52] U.S. Cl.................................. 106/52; 106/54; 106/65; 106/69; 252/12; 252/16; 252/26; 252/28; 252/30
[51] Int. Cl.². ............................................. C03C 3/04
[58] Field of Search .................... 106/52, 48, 54, 69, 106/73.5, 65, 73.4; 264/56; 308/238; 252/12, 16, 26, 28, 30

[56] References Cited
UNITED STATES PATENTS

| 3,006,775 | 10/1961 | Chen ................... 106/52 X |
| 3,022,685 | 2/1962 | Armacort.................. 308/238 X |
| 3,037,828 | 6/1962 | Michael .................. 106/48 X |
| 3,037,878 | 6/1962 | Cowler et al. .................. 106/48 X |
| 3,184,320 | 5/1965 | Michael ................ 106/52 X |
| 3,198,735 | 8/1965 | Lamson ................ 252/30 X |
| 3,227,565 | 1/1966 | Tanigawa ................ 106/52 X |
| 3,239,288 | 3/1966 | Campbell ................ 252/26 X |
| 3,242,076 | 3/1966 | Hagan ................ 106/54 X |
| 3,297,571 | 1/1967 | Bonis ................ 252/12 |
| 3,371,038 | 2/1968 | Wieser ................ 252/28 X |
| 3,485,645 | 12/1969 | Douglas ................ 106/54 X |
| 3,711,171 | 1/1973 | Orkin et al. ................ 308/238 X |

FOREIGN PATENTS OR APPLICATIONS

| 871,293 | 3/1959 | United Kingdom ................ 252/12 X |
| 986,709 | 3/1964 | United Kingdom ................ 252/12 X |
| 993,474 | 3/1964 | United Kingdom ................ 252/12 X |

Primary Examiner—Winston A. Douglas
Assistant Examiner—John F. Niebling
Attorney, Agent, or Firm—Millen, Raptes & White

[57] ABSTRACT

A compact, self-supporting solid article of manufacture consisting essentially high temperature and wear-resistant antifriction material of low thermal expansion in the form of a heterogeneous sintered article of a matrix of glass or glass ceramic of low thermal expansion and distributed within the matrix small particles of at least one temperature and wear-resistant antifriction oxide selected from the group consisting of nickel oxide, cobalt oxide, ferric oxide, bismuth oxide and chromic oxide.

13 Claims, No Drawings

HIGH-TEMPERATURE AND WEAR-RESISTANT ANTIFRICTION MATERIAL HAVING LOW THERMAL EXPANSIONS

BACKGROUND OF THE INVENTION

This invention relates to inorganic compositions and antifriction elements produced therefrom.

Antifriction materials for use at an elevated temperature are well known, for example, as bearing materials. Suitable are carbon, graphite, glass, ceramics, and porcelain, as well as specific composite elements, such as flame-sprayed coatings of metals, alloys, oxides, or fluorides on a metallic substrate. Antifriction proerties as well as the wearability of these materials are varied. Whereas temperature resistance to decomposition is satisfactory at relatively high temperatures, excessive brittleness and very high thermal expansions make these materials highly susceptible to breakage when stressed by temperature fluctuations. Likewise, composite elements on a metallic base tend to warp.

German Pat. No. 1,300,460 describes compact layers of nickel oxide with additives of fluorides, phosphates, and several specific oxides on a substrate. In this case, the ground components, for example 90% nickel oxide and 10% calcium fluoride, are sintered and after several grinding steps, are applied by flame-spraying to a nickel-chromium alloy. It is also possible to sinter these components onto a support. The additional oxides serve to lower the melting temperatures by the formation of an eutectic.

A disadvantage of this process is the required necessary adaptation of the thermal expansion of the antifriction compound to that of the substrate. As a consequence, layers of a thickness of only 1–2 mm. can, for example, be applied by flame-spraying to the substrate, since these layers develop fine cracks due to differences in the thermal expansions. Another disadvantage is that the rustproof alloys of the substrate which, in principle, all have high coefficients of thermal expansion, tend to warp when used in an elevated temperature range, due to unavoidable temperature gradients, and this, in turn, damages the sprayed-on or sintered-on antifriction compound layer.

Further pertinent teachings relating to the production of antifriction elements based on NiO are found in British Pats. Nos. 871,293; 993,474; and 986,709.

SUMMARY

A principal object of this invention is to provide an antifriction material which does not exhibit the disadvantages of known antifriction materials as described above and which, in particular, withstands the stresses arising from substantial temperature fluctuations.

Upon further study of the specification and appended claims, other objects and advantages of the present invention will become apparent.

Another object is to provide articles of manufacture, for example, bearings produced from such materials.

These objects are attained by providing a material consisting essentially of a matrix of glass or glass ceramic and antifriction oxides, principally nickel oxide, as well as optionally further additives, incorporated into this matrix.

The antifriction material can be produced, for example, by adding to such a matrix the nickel oxide, optionally together with additives, mixing the components, and sintering the mixture after compressing with a binder at a temperature of between about 1000° and 1400° C., the optional sintering temperature depending on the type of matrix and additional component or components. The sintering step can also take place under the simultaneous application of pressure (hot-pressing). This is of advantage, in particular, if it is intended to expose oxidation-sensitive component parts to a high temperature for only a short period of time. Also the process of extrusion at an elevated temperature can be utilized. Preferably, the total material consists essentially of 20 – 80% and especially 33 to 67 % by weight of glass or glass ceramic as the matrix, and 80 – 20%, especially 67 to 33%, by weight of antifriction oxides, especially NiO, with or without further additives as the antifriction oxide portion.

As a substitute for, or in addition to nickel oxide, there can be employed other suitable oxides having antifriction properties and which are temperature and wear-resistant. Such oxides include cobalt oxide, chromium oxide, bismuth oxide, and iron oxide. The oxides or cobalt and nickel, in particular, show good antifriction properties when bound ceramically, for example by calcium fluoride. (The favorable antifriction properties of these substances, coated in thin layers as a porous substance onto a metallic substrate, are compared to temperature-resistant steel in Ceram. Bull. 41 (8), 1962, pp. 504–508. However, these materials, when fritted or melted onto alloyed steel in layers of up to a few hundredths of a millimeter, cannot be exposed to a strong wear and tear.)

The stability of the materials of this invention to temperature fluctuation is based on the fact that a glass or a glass ceramic of low thermal expansion is employed as the matrix. By low thermal expansion is meant an expansion of from $-10$ to $+50.10^{-7}$ per degree Celsius.

Such glasses may have the following compositions:

| | |
|---|---|
| $SiO_2$ | 40–80 weight % |
| $Al_2O_3$ | 0–40 weight % |
| $B_2O_3$ | 0–70 weight % |
| Alkali metal oxides | 2–20 weight % |
| MeO-oxides | 0–12 weight % |
| Nucleating agents, such as $TiO_2$ and/or $ZnO_2$ | 0–6 weight % |
| Other oxides | 0–10 weight % |

According to the invention, the matrix may preferably consist of a glass having the following composition:

| | |
|---|---|
| $SiO_2$ | 51.0% by weight |
| $Al_2O_3$ | 36.7% by weight |
| $Li_2O$ | 12.3% by weight | which, after admixing a temperature and wear-resistant antifriction composite compound, with or without additives, is converted during the subsequent sintering step into a glass ceramic by controlled crystallization. Conversely, it is also possible to use stable glasses having low coefficient of expansion, so that the original glass phase remains preserved as a matrix in a substantially unchanged form.

DETAILED DISCUSSION

In accordance with a further aspect of this invention, the antifriction oxide portion of the composition contains fluoride additives, especially calcium fluoride, preferably 10 to 25 % by weight, as well as lead oxide, preferably 5 to 30 % by weight, and magnesium phosphate, preferably 5 to 15 % by weight. Mixtures of such additives can also be employed.

As mentioned above, nickel oxide can be replaced entirely or partially by cobalt oxide, iron oxide, bismuth oxide, or chromium oxide, either individually or together; however, it is preferred to employ nickel oxide in an amount of the antifriction oxide portion of at least 70, more preferably at least 80% by weight.

Finally, the antifriction oxide portion of this invention can contain as an additive, nickel and/or cobalt powder, preferably in amounts based on the antifriction oxide portion of about 0 to 30, more preferably 5 to 20% by weight.

It is of interest to note that the oxides of nickel, cobalt, iron, bismuth, and chromium, as well as the fluorides, particularly calcium fluoride, as well as lead oxide and magnesium phosphate are also known to be employed in glass compositions for certain purposes. Cobalt oxide, nickel oxide, iron oxide, and chromium oxide serve, for example, as coloring oxides; calcium fluoride serves as the means for reducing the refractive power of the resultant glass. Lead oxide and bismuth oxide, in turn, increase the refractive power and therefore are utilized especially for optical glasses. Also, magnesium phosphate is a frequent component of optical phosphate glasses. These oxides and fluorides thus are readily easily dissolved in glasses. Consequently, one had to assume initially that, by the sintering together of extremely finely divided powders of glasses and/or glass ceramics with the aforementioned fluorides and oxides at high temperatures, a considerable absorption of the additional antifriction oxide components into the glass would take place, which would thereby result in corresponding, disadvantageous changes of the matrix as well as of the additional components. Surprisingly, this is not the case, or to such a minor extent that possible changes escape detection. An assurance that the additional antifriction components are present in the unchanged form in the sintered material and that no recognizable new compounds, e.g. nickel or calcium compounds, are formed, was obtained by means of X-ray diffraction photographs. It can thus be assumed that, only in a very thin reaction layer in atomic proportions, have chemical changes occurred, which are actually quite desirable for bonding reasons; however, these changes are without detectable effects on the desired properties of the individual components. The above-mentioned interaction of the various powder components in a relatively thin contact zone can be varied by using, as starting component for the matrix, glasses and/or glass ceramics of a lower or also a higher reactivity, in the light of the known reaction characteristics of the additional components. For example, increasing amounts of $B_2O_3$ and/or alkali metal oxides can be expected to make the glass more reactive.

The glass ceramics can also be composed so that they are extensively or also completely crystallized during the heating cycle and thus can be considered, in the limiting case, as a glass-free ceramic.

According to the invention, the antifriction components can be preliminarily sintered together with the further additives, but without the matrix, and only after grinding and admixing to the powder of the glass matrix, the sintering process to form the final composite element is carried out. It is preferred that the particle size of the components of the matrix be about 5 to 100 microns, and that of the ground antifriction component be about 5 to 100 microns.

To ensure that the resultant antifriction materials have the desired properties, it is preferred that the following process conditions be observed:

1. Dry or (preferably) wet grinding the raw materials down to a particle size of less 60 microns;
2. Mixing the components in a ball mill;
3. Adding a binding agent, such as paraffin wax, nitro cellulose dissolved in amyl acetate, etc., in an amount of from 0.5 to 3% by weight of the total mixture;
4. Wet pressing the mixture at a pressure of from 100–2000 Kg/cm$^2$;
5. Pre-drying the body at about 40° to 70°C for about 4 to 48 hours;
6. Burning off the binding agent and pre-sintering the body at a rate of about 60°C per hour to a temperature of about 770°C;
7. Maintaining the body at about 770°C for 2 to 20 hours;
8. Sintering the body by heating it to about 975° to 1200°C at a rate of about 25°C per hour;
9. Maintaining the body at the sintering temperature for about 0.5 to 6 hours; and
10. Cooling the body to room temperature.

In order to utilize the antifriction materials of this invention for the production of bearings, it is necessary to preclude any tendency toward the formation of a welding bond with the opposing sliding surface. Due to the low reactivity of the materials of this invention, such a welding bond is not formed. Sintered elements of the present invention can thus be used at elevated temperatures in the range of 800°–1100°C. The antifriction articles have a relatively low hardness and a low modulus of elasticity, resulting in excellent antifriction properties.

In order to remove frictional heat during operation of the bearing, the bearing should normally have a significant heat conductivity. Although such conductivity is substantially lower in the present ceramic composite materials than in the case of metallic materials, the heat conductivity of the product of this invention can be increased by sintering, for example, pulverized nickel or cobalt into the composition, under a protective gas atmosphere, e.g. an inert gas, without affecting the utility of the products at high temperatures.

The temperature and wear-resistant antifriction materials of this invention can be utilized in all those cases where, previously, similar temperature-resistant substances have been used, such as graphite, glass, ceramic, or porcelain. As compared to these materials, substantial advantages are obtained. The thermal expansion is in most cases low as compared to ceramic antifriction materials. This expansion can be varied within wide limits by a corresponding choice of the matrix, the additional components, as well as the weight ratios. The expansion can be adjusted to be at a low value; it can amount to zero; or it can even be negative. Due to this low thermal expansion, an excellent resistance to fluctuating temperatures is obtained. The chemical resistance of the products and wear-resistance, including the impact strength, are also relatively high.

Examples of articles of manufacture that can be produced on the basis of the antifriction materials of this invention include, but are not limited to: bearings, fittings, linings, heat resistant elements, etc.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

A glass having the following composition by weight:

| | |
|---|---|
| $SiO_2$ | 51.0% |
| $Al_2O_3$ | 36.7% |
| $Li_2O$ | 12.3% | is melted conventionally in a ceramic crucible, and the melt is poured in a thin stream into water for quenching purposes. The granulated material is ground for 60 hours in a ball mill. The thus-obtained ground substance is screened and the fraction having a particle size higher than 60 microns is discarded. Thereupon, the fine glass powder is mixed with a material brought to the same degree of fineness, consisting of 85% of nickel oxide and 15% of calcium fluoride, in a weight ratio of 1 : 1.

The mixing step can also be accomplished in the ball mill. The mixture is then pressed, after adding a binder, e.g. paraffin, nitrocellulose plus amyl acetate, or "Cellofas", an aqueous solution of a cellulose derivative and water, into a molded article, e.g. a plate of $50 \times 50 \times 12$ mm. This is done, for example, in a manual press having a compressive pressure of 2 tons. The pressed article is predried for 48 hours on a sand bath at 60°C. The further drying process, the burning out of the binder, and the sintering take place according to the following scheme:

a. heating the article up to 770° C. at a heating speed of 60° per hour;
b. maintaining it at a temperature of 770° C. for 16 hours;
c. heating the article at a rate of 25° C. per hour to the final temperature of 1160° C.; and
d. maintaining it at a temperature of 1160° C. for 4 hours.

The test article is then cooled in the furnace to room temperature without precautions.

The resultant sintered article has a greyish-green appearance, and the definition of the pressed edges is essentially unchanged. The coefficient of friction is between 0.15 and 0.6, depending on the technique of measurement thereof and purposes of application. The density is 3.50, the porosity is 10.0%, the fusion shrinkage is 17%, the flexural tensile strength is 690 kp./cm$^2$, the impact strength is about 10 times greater as sintered corumdum, and the average thermal expansion is minus $1.7 \cdot 10^{-7}$ per degree Celsius within the temperature range of 20° – 80° C.

EXAMPLE 2

A glass powder having the composition set forth in Example 1 is mixed, in a ratio of 1 : 2, with a presintered and ground material, consisting of 85% of nickel oxide and 15% of calcium fluoride, and, after adding a binder, is pressed, dried, and sintered at 1180° C. The sintered article has a thermal expansion of minus $1.2 \cdot 10^{-7}$ per degree Celsius at 20° – 800° C.

EXAMPLE 3

A glass powder having the composition according to Example 1 is mixed, in a ratio of 3 : 1, with a pulverized material, consisting of 80% of nickel oxide and 20% of calcium fluoride and, after adding a binder, is pressed, dried, and sintered at 1130° C. The sintered article has a thermal expansion (20° – 800° C.) of minus $12.3 \cdot 10^{-7}$ per degree Celsius.

EXAMPLE 4

A glass powder according to Example 1 is mixed with a pulverized material, consisting of 95% of nickel oxide and 5% of PbO, in a ratio of 1 : 1, and after adding a binder, is pressed, dried, and sintered at 1300° C. The sintered article has a thermal expansion (20° – 800° C.) of $2.1 \cdot 10^{-7}$ per degree Celsius.

EXAMPLE 5

A glass powder according to Example 1 is mixed, in a ratio of 1 : 1, with a pulverized material, consisting of 80% of nickel oxide and 20% of pulverized metallic nickel and, after addition of the binder, is pressed, dried, and sintered at 1260° C. The thermal expansion of the sintered article (20° – 800° C.) is $5 \cdot 10^{-7}$ per degree Celsius.

EXAMPLE 6

A glass powder according to Example 1 is mixed, in a ratio of 1 : 3, with pulverized nickel oxide and, after adding the binder, is pressed, dried, and sintered at 1300° C. The sintered article shows a thermal expansion (20° – 800° C.) of $10.4 \cdot 10^{-7}$ per degree Celsius.

EXAMPLE 7

A glass having the following composition:

| | |
|---|---|
| $SiO_2$ | 71.4% |
| $Al_2O_3$ | 19.0% |
| $Li_2O$ | 3.5% |
| $Na_2O$ | 0.5% |
| $K_2O$ | 0.3% |
| ZnO | 1.1% |
| $TiO_2$ | 1.8% |
| $ZrO_2$ | 1.8% |
| F | 0.15% |
| $Sb_2O_3$ | 0.6% | is mixed, after quenching and grinding, with a pulverized material, consisting of 80% of nickel oxide and 20% of calcium fluoride, in a ratio of 3 : 1 and, after adding the binder, is pressed, dried, and sintered at 1150° C. The sintered article has a thermal expansion (20° – 800° C.) of $24.7 \cdot 10^{-7}$ per degree Celsius.

EXAMPLE 8

A glass powder according to Example 7 is mixed with pulverized material consisting of 85% of nickel oxide and 15% of calcium fluoride, in ratio of 1 : 3 and, after adding the binder, is pressed, dried, and sintered at 1200° C. The sintered article has a thermal expansion (20° – 800° C.) of $112.9 \cdot 10^{-7}$ per degree Celsius.

EXAMPLE 9

A glass powder according to Example 1 is mixed with a powdered material, consisting of 90% of nickel oxide and 10% of magnesium pyrophosphate and, after adding the binder, is pressed, dried, and sintered at 1200° C. The sintered article has a thermal expansion (20° – 800° C.) of $23.5 \cdot 10^{-7}$ per degree Celsius.

Further examples are compiled in the following table:

| No. | Type of Glass | Additives | | Weight Ratio Glass/Additives | Sintering Temperature in °C. |
|-----|---------------|-----------|--|------------------------------|------------------------------|
| 10 | According to Example 1 | NiO<br>CaF$_2$ | 60%<br>40% | 1 : 1 | 975 |
| 11 | " | NiO<br>CoO<br>Cr$_2$O$_3$<br>CaF$_2$ | 45%<br>20%<br>15%<br>20% | 1 : 1 | 1020 |
| 12 | " | NiO<br>PbO<br>CaF$_2$ | 55%<br>30%<br>15% | 1 : 1 | 975 |
| 13 | " | NiO<br>Bi$_2$O$_3$<br>CaF$_2$ | 40%<br>40%<br>20% | 1 : 1 | 1020 |
| 14 | " | Cr$_2$O$_3$<br>CaF$_2$ | 80%<br>20% | 1 : 1 | 1040 |
| 15 | " | NiO<br>Cr$_2$O$_3$<br>CaF$_2$ | 65%<br>20%<br>15% | 1 : 1 | 1080 |
| 16 | " | NiO<br>Mg$_2$P$_2$O$_7$ | 90%<br>10% | 1 : 1 | 1200 |
| 17 | " | Fe$_2$O$_3$<br>CaF$_2$ | 85%<br>15% | 1 : 1 | 1140 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compact, self-supporting solid article of manufacture consisting essentially of high temperature and wear-resistant antifriction material of low thermal expansion in the form of a heterogeneous sintered article of a matrix of glass or glass ceramic of low thermal expansion and distributed substantially uniformly within the matrix small particles comprising at least one temperature and wear-resistant antifriction oxide selected from the group consisting of nickel oxide, cobalt oxide, ferric oxide, bismuth oxide and chromic oxide, said matrix having a thermal expansion of from −10 to +50.10$^{-7}$ per degree Celsius and comprising the following composition in percent by weight

| | |
|---|---|
| SiO$_2$ | 40 – 80 |
| Al$_2$O$_3$ | 0 – 40 |
| B$_2$O$_3$ | 0 – 70 |
| alkali metal oxides | 2 – 20. |

2. An article of manufacture as defined by claim 1, wherein the solid article comprises 20–80% by weight of glass or glass ceramic as the matrix and 80–20% of the small particles as the temperature and wear-resistant antifriction oxide.

3. An article of manufacture according to claim 1, wherein the matrix consists of a glass having about the following composition:

| | |
|---|---|
| SiO$_2$ | 51.0% by weight |
| Al$_2$O$_3$ | 36.7% by weight |
| Li$_2$O | 12.3% by weight. |

4. An article of manufacture according to claim 1, wherein said small particles comprise a member selected from the group consisting of calcium fluoride, lead oxide, magnesium phosphate, and mixtures thereof.

5. An article of manufacture according to claim 1, wherein said antifriction oxide comprises at least 70% by weight nickel oxide.

6. An article of manufacture according to claim 1, containing a metallic additive selected from the group consisting of nickel powder, cobalt powder and mixtures thereof.

7. An article of manufacture according to claim 1, wherein said small particles have a particle size of 5 to 100 microns.

8. An article of manufacture as defined by claim 7, wherein the solid article comprises 20–80% by weight of glass or glass ceramic as the matrix and 80–20% of the small particles as the temperature and wear-resistant antifriction oxide.

9. An article of manufacture according to claim 8, wherein said antifriction oxide comprises at least 70% by weight nickel oxide.

10. An article of manufacture according to claim 6, wherein said metallic additive is present in a concentration be weight of 5 – 20% based on the weight of the anti-friction particles.

11. An article according to claim 1 which is a bearing.

12. An article according to claim 2 which is a bearing.

13. An article according to claim 6 which is a bearing.

* * * * *